United States Patent
Hundt et al.

(10) Patent No.: US 7,765,242 B2
(45) Date of Patent: Jul. 27, 2010

(54) METHODS AND APPARATUS FOR STRUCTURE LAYOUT OPTIMIZATION FOR MULTI-THREADED PROGRAMS

(75) Inventors: Robert Hundt, Palo Alto, CA (US); Sandya S. Mannarswamy, Bangalore (IN); Easwaran Raman, Princeton, NJ (US)

(73) Assignee: Hewlett-Packard Development Company, L.P., Houston, TX (US)

(*) Notice: Subject to any disclaimer, the term of this patent is extended or adjusted under 35 U.S.C. 154(b) by 554 days.

(21) Appl. No.: 11/801,970

(22) Filed: May 10, 2007

(65) Prior Publication Data

US 2008/0282035 A1 Nov. 13, 2008

(51) Int. Cl.
G06F 7/00 (2006.01)
G06F 17/30 (2006.01)
G06F 12/00 (2006.01)
(52) U.S. Cl. .................. 707/803; 707/802; 711/128
(58) Field of Classification Search .................. 711/128, 711/E12.078; 707/100, 104.1, 802, 803
See application file for complete search history.

(56) References Cited

U.S. PATENT DOCUMENTS

| | | | | |
|---|---|---|---|---|
| 5,822,588 A * | 10/1998 | Sterling et al. | | 717/131 |
| 5,950,228 A * | 9/1999 | Scales et al. | | 711/148 |
| 6,021,480 A * | 2/2000 | Pettey | | 711/201 |
| 6,535,961 B2 * | 3/2003 | Wilkerson et al. | | 711/137 |
| 6,654,950 B1 * | 11/2003 | Barnishan | | 717/136 |
| 6,678,805 B1 * | 1/2004 | Corduneanu et al. | | 711/154 |
| 6,886,148 B2 * | 4/2005 | Solomon | | 716/11 |
| 7,093,081 B2 * | 8/2006 | DeWitt et al. | | 711/144 |
| 7,114,036 B2 * | 9/2006 | DeWitt et al. | | 711/141 |
| 7,143,404 B2 * | 11/2006 | Haghighat et al. | | 717/159 |
| 7,363,450 B1 * | 4/2008 | Fedorova | | 711/167 |
| 7,457,931 B1 * | 11/2008 | Fedorova | | 711/167 |
| 7,496,908 B2 * | 2/2009 | DeWitt et al. | | 717/158 |
| 7,526,757 B2 * | 4/2009 | Levine et al. | | 717/130 |
| 2002/0062423 A1 * | 5/2002 | Wilkerson et al. | | 711/118 |
| 2004/0154019 A1 * | 8/2004 | Aamodt et al. | | 718/102 |
| 2005/0154838 A1 * | 7/2005 | DeWitt et al. | | 711/144 |
| 2005/0154839 A1 * | 7/2005 | DeWitt et al. | | 711/144 |
| 2005/0155019 A1 * | 7/2005 | Levine et al. | | 717/127 |
| 2005/0155026 A1 * | 7/2005 | DeWitt et al. | | 717/158 |
| 2006/0184739 A1 * | 8/2006 | Frommer et al. | | 711/126 |
| 2007/0043531 A1 * | 2/2007 | Kosche et al. | | 702/182 |

(Continued)

OTHER PUBLICATIONS

Ramaswamy, Subramanian, et al., "Data Trace Cache: An Application Specific Cache Architecture", ACM SIGARCH Computer Architecture News, vol. 34, No. 1, Mar. 2006, pp. 11-18.*

(Continued)

*Primary Examiner*—Robert Stevens

(57) ABSTRACT

A computer-implemented method for performing structure layout optimization of a data structure in a multi-threaded environment is provided. The method includes determining a set of code concurrency values. The method also includes calculating a set of cycle gain values. The method further includes employing the set of cycle gain values and the set of code concurrency values to create a field layout graph, which is configured to illustrate relationship between a set of data fields of the data structure. The method yet also includes employing a cluster algorithm to the field layout graph to create a set of clusters. Each cluster of the set of clusters is employed to generate a cache line.

20 Claims, 13 Drawing Sheets

U.S. PATENT DOCUMENTS

| | | | |
|---|---|---|---|
| 2007/0124732 A1* | 5/2007 | Lia et al. | 718/102 |
| 2007/0286483 A1* | 12/2007 | Delong et al. | 382/173 |
| 2008/0127120 A1* | 5/2008 | Kosche et al. | 717/131 |
| 2008/0177756 A1* | 7/2008 | Kosche et al. | 707/100 |
| 2008/0244533 A1* | 10/2008 | Berg et al. | 717/128 |

OTHER PUBLICATIONS

Hong, Jumnit, et al., "Design, Implementation and Verification of Active Cache Emulator (ACE)", FPGA '06, Monterey, CA, Feb. 22-24, 2006, pp. 63-72.*

Annavaram, Murali, et al., "Call Graph Prefetching for Database Applications", ACM Transactions on Computer Systems, vol. 21, No. 4, Nov. 2003, pp. 412-444.*

Song, Justin, et al., "Parallelization of Bayesian Network Based SNPs Pattern Analysis and Performance Characterization on SMP/HT", ICPADS '04, Jul. 7-9, 2004, pp. 315-322.*

Kandemir, Mahmut, et al., "Reducing False Sharing and Improving Spatial Locality in a Unified Compilation Framework", IEEE Transactions on Parallel and Distributed Systems, vol. 14, No. 4, Apr. 2003, pp. 337-354.*

Anderson, Jennifer M., et al., "Data and Computation Transformations for Multiprocessors", PPOPP '95, Santa Clara, CA, © 1995, pp. 166-178.*

Rosenblum, Mendel, et al., "Using the SimOS Machine Simulator to Study Complex Computer Systems", ACM Transactions on Modeling and Computer Simulation, vol. 7, No. 1, Jan. 1997, pp. 78-103.*

Kandemir, Mahmut, et al., "An Integer Linear Programming Approach for Optimizing Cache Locality", ICS '99, Rhodes, Greece, © 1999, pp. 500-509.*

Roest, Niels Peter, "MIPhS: A Configurable Hardware Simulator", Delft Univ. of Technology Master's Thesis, CARDIT, Codenumber: 1-68340-28(2000)-11, Sep. 4, 2000, pp. i-vi and 1-57.*

Huh, Jaehyuk, et al., "Coherence Decoupling: Making Use of Incoherence", ASPLOS '04, Boston, MA, Oct. 9-13, 2004, pp. 97-106.*

Kandemir, Mahmut, et al., "Static and Dynamic Locality Optimizations Using Integer Linear Programming", IEEE Transactions on Parallel and Distributed Systems, vol. 12, No. 9, Sep. 2001, pp. 922-941.*

Torrellas, Josep, et al., "False Sharing and Spatial Locality in Multiprocessor Caches", IEEE Transactions on Computers, vol. 43, No. 6, Jun. 1994, pp. 651-663.*

* cited by examiner

```
Struct S
{
    int f1;
    int f2;
    int f3;
    int f4;
    int f5;
    int f6;
    int fi;
    int fj;
    int fk;
    int fl;
    int fm;
    int fn;
}
void for {
    struct S S[N];
    for(i=0; i<n; i++)
    }
    sum += s[u] • f₁ x s[u] fₙ;
}
```

Loop 408

FIG. 4B

METHODS AND APPARATUS FOR STRUCTURE LAYOUT OPTIMIZATION FOR MULTI-THREADED PROGRAMS

BACKGROUND OF THE INVENTION

Computer has long been employed to process data. In a typical computer system, a plurality of application programs may be executed. Since a computer system has limited resources, the ability for a computer system to optimize memory performance becomes critical as more application programs are competing for the same memory resources.

One method for improving memory performance of an application program is to manage the layout of data fields in a data structure. FIG. 1 shows a conceptual block diagram illustrating a data structure. Consider the situation wherein, for example, a user is attempting to access a data structure that has a plurality of employee records, such as an employee record. The user may employ an application program to employ a processor 102 to access an employee record 104 in main memory 106. Employee record 104 may include a plurality of data fields, including a name field 108, an employee number field 110, a salary field 112, and an address field 114.

Since the latency effect on a cache is less than on main memory, memory performance increases if an application program is accessing data stored in the cache than in main memory. To minimize the number of time the application program may have to access the main memory, time and resources have been spent in optimizing structure layout of a data structure. In an example, data being processed may be copied into a cache 116 for faster access as a cache line. To increase the possibility that data fields that may be accessed simultaneously are brought into cache 116 at the same time, spatial locality optimizations may be performed. As discussed herein, spatial locality refers to the arrangement of data fields in a manner that may increase the likelihood of data fields that may be assessed together are brought in on the same cache line. In an example, name field 108, employee number field 110, and salary field 112 are referenced together, such as in the same loop of an application program. To increase the cache hit, the three aforementioned data field may be placed close to one another in order to increase the possibility that the three data fields are brought together into cache 116 in the same cache line, such as a cache line 118.

For a single thread application, spatial locality generally improves memory performance. Unfortunately, optimizing spatial locality in a multi-threaded environment may also cause false sharing to occur, resulting in worsening memory performance. False sharing usually occurs in a multi-threaded environment in which two or more processes/threads are attempting to access a cache line simultaneously.

FIG. 2 shows a simple conceptual diagram illustrating false sharing in a multi-threaded environment. Main memory 202 may include a data structure with a plurality of data records, including employee record 204. Employee record 204 may include a plurality of data fields, such as a name field 206, an employee number field 208, a salary field 210, and an address field 212.

Consider the situation wherein, for example, multiple threads are trying to access the employee record. Each of the threads may be associated with a processor (e.g., processor 214, 216, and 218). During execution of the application program, multiple processors (e.g., processor 214, 216, and 218) may be accessing the same data fields, which may be copied into cache 220, cache 222, and cache 224, respectively, as a cache line 226.

Multiple threads may access the same cache line without causing conflict as long as each of the threads is only reading one or more data fields from the same cache line. However, if a processor attempts to write (e.g., add, modify, etc.) to a data field, while other processors are accessing the same cache line, then a cache coherency problem may occur. As discussed herein, cache coherency refers to the integrity of cache line saved at the different caches. In other words, an update to a cache line needs to be replicated and made visible to the other processors in order to maintain integrity of data and prevent conflict.

In an example, processor 214 wants to modify salary field 210, processor 216 is reading name field 206, and processor 218 is reading employee number field 208. If processor 214 modifies salary field 210, the data fields stored in cache 222 and cache 224 are not updated with the change and conflict may arise. As a result, false sharing may occur since the processors are now referencing different versions of the same cache line.

In order to prevent false sharing, a processor may have to gain full ownership of the cache line before a change may be made to the data fields in the cache line. In an example, before processor 214 may modify salary field 210, processor 214 may have to invalidate the other copies of cache line 226, which may reside in cache 222 and cache 224. Accordingly, the efficiency that a multi-threaded environment should provide is diminished due to false sharing. As a result, memory performance in a multi-threaded environment may actually deteriorate since processors are expending resources to gain ownership of cache lines in order to prevent false sharing.

BRIEF SUMMARY OF THE INVENTION

The invention relates, in an embodiment, to a computer-implemented method for performing structure layout optimization of a data structure in a multi-threaded environment. One particular implementation of the method includes determining a set of code concurrency values. The method also includes calculating a set of cycle gain values. The method further includes employing the set of cycle gain values and the set of code concurrency values to create a field layout graph, which is configured to illustrate relationship between the set of data fields of the data structure. The method yet also includes employing a cluster algorithm to the field layout graph to create a set of clusters. Each cluster of the set of clusters is employed to generate a cache line.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF SEVERAL VIEWS OF THE DRAWINGS

The present invention is illustrated by way of example, and not by way of limitation, in the figures of the accompanying drawings and in which like reference numerals refer to similar elements and in which:

FIG. 4B shows an example of a pseudo code.

DETAILED DESCRIPTION OF EMBODIMENTS

Figure 1:
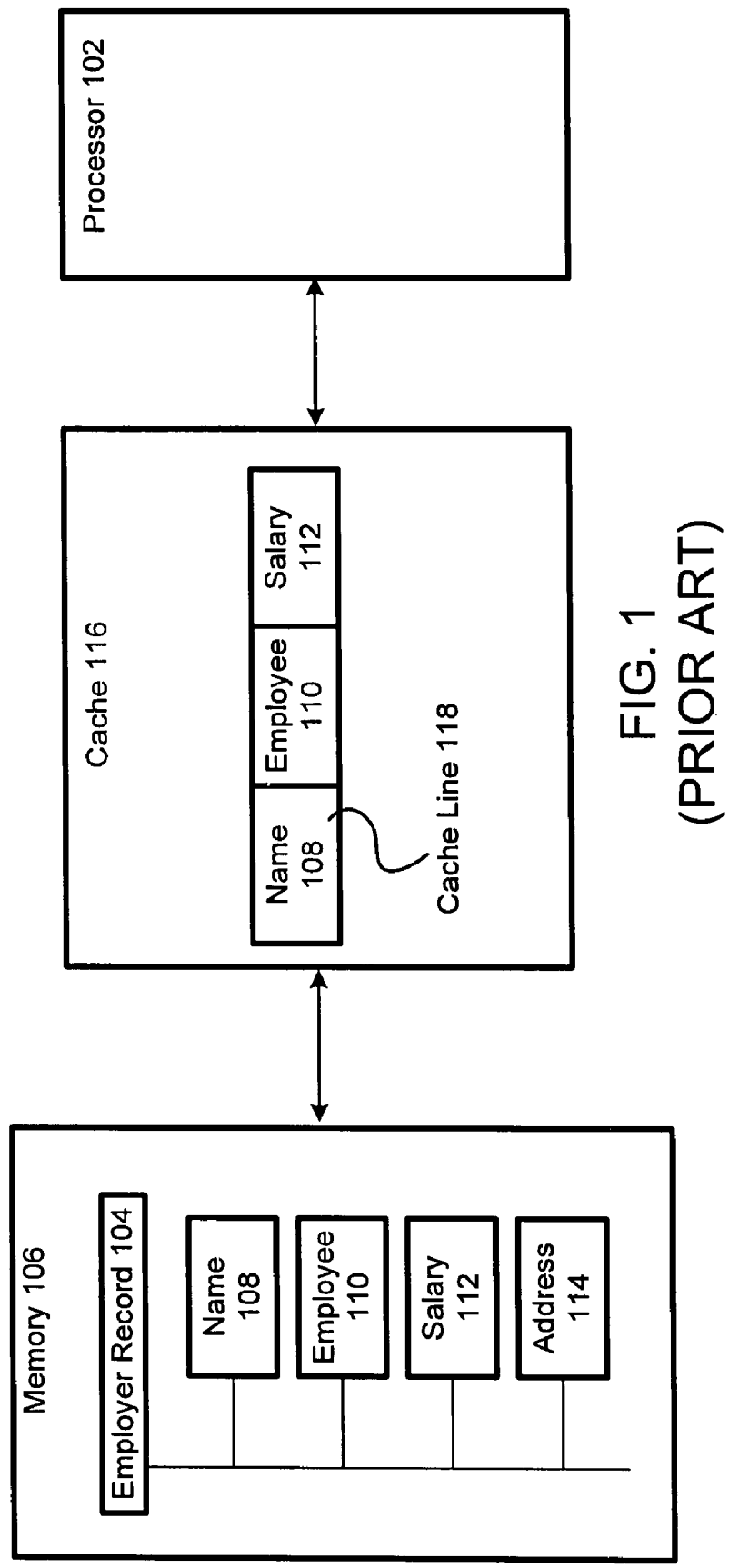
FIG. 1 shows a conceptual block diagram illustrating a data structure.
Figure 2:
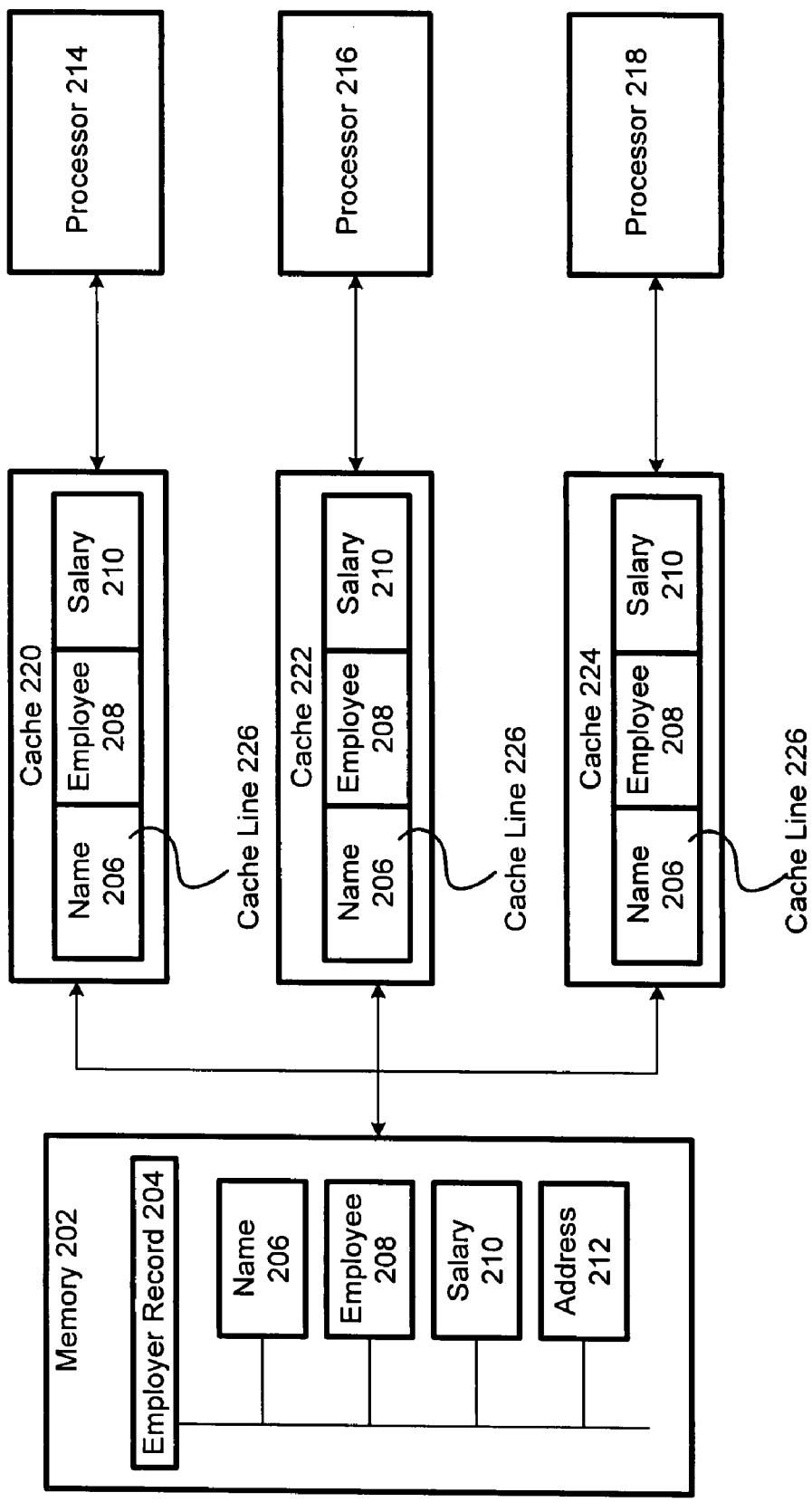
FIG. 2 shows a simple conceptual diagram illustrating false sharing in a multi-threaded environment.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In one aspect of the invention, the inventors herein realized that in a multi-threaded environment, optimizing spatial locality alone may not produce the desirable result of memory performance optimization. Instead, maximizing spatial locality may have to be balanced against minimizing false sharing in order to assure optimal memory performance in a multi-threaded environment. In accordance with embodiments of the present invention, methods and apparatus are provided for performing structure layout optimization in a multi-threaded environment.

In this document, various implementations may be discussed using threads as an example. This invention, however, is not limited to threads and may include any action that an application program may employ. Instead, the discussions are meant as examples and the invention is not limited by the examples presented.

In one or more embodiments of the invention, the creation of an optimized multi-threaded structure layout may include calculating cycle gain. As discussed herein, cycle gain refers to a potential gain that may accrue due to spatial locality when two data fields are placed in the same cache line. In other words, the placement of two data fields spatially close to one another may improve memory performance if the two data fields are accessed together in the same cache line.

In an embodiment, cycle gain may be calculated for each pair of data fields by analyzing the application execution profile (e.g., runtime profile) of an application program. The cycle gain between a pair of data fields may either be zero, the execution count of a loop, or the execution count of a straight line function. In an embodiment, the cycle gain between a pair of data fields is zero if the pair of data fields is not accessed in the same function. In another embodiment, the cycle gain between a pair of data fields is the execution count of a loop if the pair of data fields is accessed in the same loop function. In yet another embodiment, the cycle gain between a pair of data fields is the execution count of a straight line function if the pair of data fields is accessed in the same basic block function. By analyzing the cycle gains of an application program, spatial locality may be determined for a data structure.

In yet one or more embodiments of the invention, the creation of an optimized multi-threaded structure layout may also include determining code concurrency in an application program. As discussed herein, code concurrency refers to a situation in which two or more basic blocks may be executed at about the same time. In an embodiment, code concurrency may be determined by analyzing the runtime profile of an application program. In an embodiment, calculating the value for code concurrency between a pair of basic blocks that access the same data structure may include determining the frequency a pair of basic blocks may be executed at about the same time. In identifying code concurrency, the algorithm identified the likelihood that two basic blocks that access the same data structure may cause false sharing between two data fields. In other words, code concurrency may increase memory latency. A particular implementation of measuring code concurrency is by synchronized sampling wherein sampling of program counters is performed on individual processors but the samples are correlated and synchronized across the entire system to determine the frequency a pair of basic blocks may be executed at about the same time.

In contrast to the prior art of only maximizing spatial locality to provide a structure layout, embodiments of the invention may balance maximizing spatial locality while minimizing false sharing to create a structure layout that may provide the best memory performance in a multi-threaded environment. In an embodiment, layout tools may be employed to create optimized multi-threaded structure layout that maximizes spatial locality and minimizes false sharing. A layout tool that may be employed is a field layout graph. With the field layout graph, the data fields may be mapped as nodes on the field layout graph.

Embodiments of the invention may include employing the values calculated for cycle gain and/or code concurrency to create a field layout graph that accounts for spatial locality while minimizing false sharing. In an embodiment, the cycle gain calculations may be employed to create the edges (lines) between the data fields. In an example, a line may be employed to show a connection between a pair of data fields.

In yet another embodiment, an edge weight value may be calculated for each pair of connected data fields. As discussed herein, an edge weight value refers to a value that represents the difference between false sharing and cycle gain. In other words, edge weight value may represent potential gain or loss that may occur in placing two or more data fields (nodes) in the same cache line. In an embodiment, a higher positive edge weight value usually indicates a higher possibility of spatial locality and a lesser chance for false sharing.

Once the field layout graph has been customized, a cluster algorithm may be employed as a layout tool to group the nodes (e.g., data fields) into clusters. In an embodiment, a cluster may include a set of data fields that may be accessed at about the same time. Also, the cluster algorithm may group the data fields into clusters that may maximize the intra-cluster edge weight but minimizes the inter-cluster edge weight.

Once a set of clusters have been identified, each cluster may be employed to create a cache line. Unlike the prior art, the cache line with the optimized multi-threaded structure layout may balance spatial locality with false sharing. As a result, less cache line invalidation may occur during execution of an application program, thereby improving memory performance.

The features and advantages of the present invention may be better understood with reference to the figures and discussions that follow.

Figure 3:
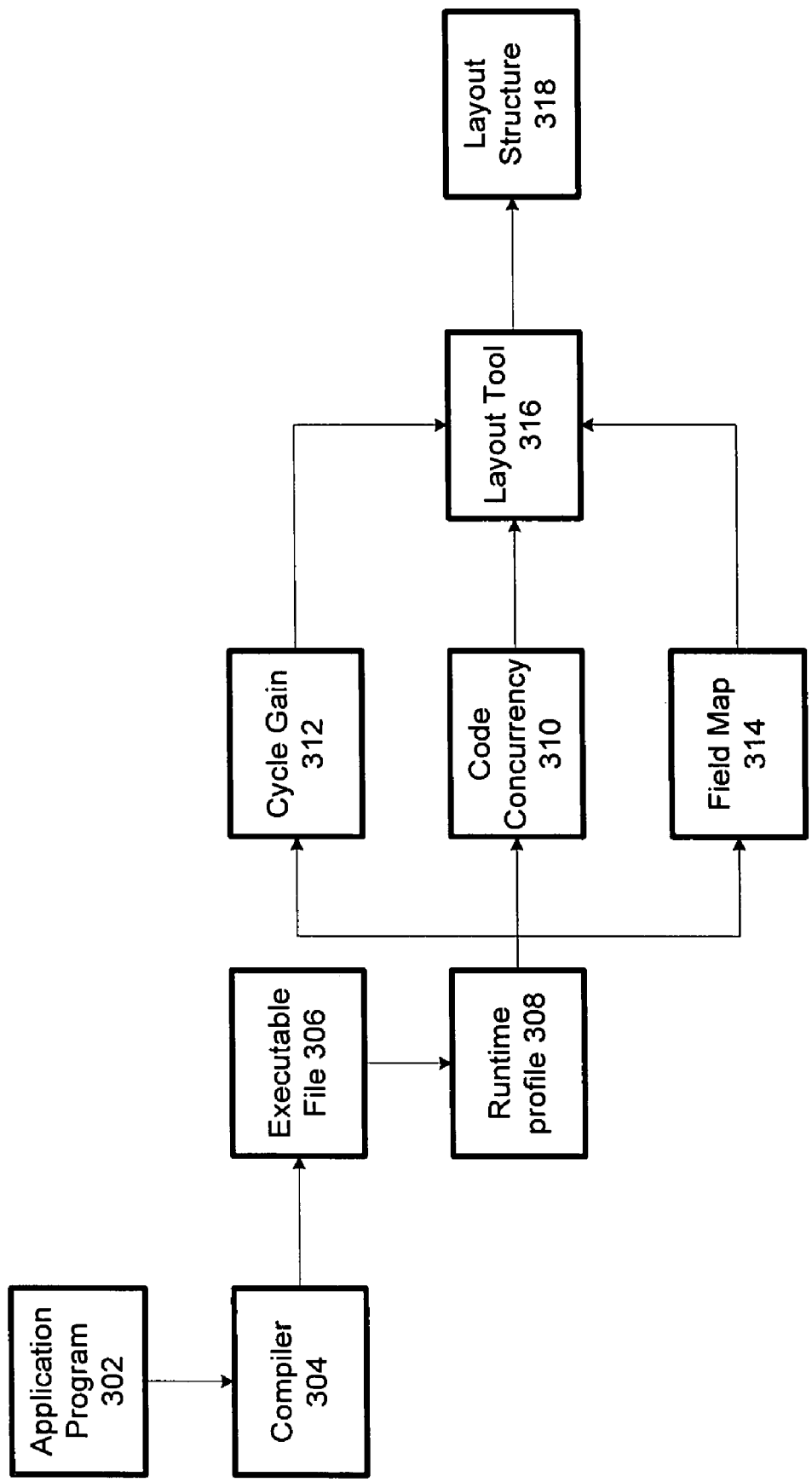
FIG. 3 shows, in an embodiment, a high level overall flow diagram for generating a new structure layout optimized for multi-threaded application programs.

FIG. 3 shows, in an embodiment, a high level overall flow diagram for generating a new structure layout optimized for multi-threaded application programs.

An application program 302 may be compiled by a compiler 304 to create an executable file 306. From executable file 306, a runtime profile 308 may be generated to determine when each basic block may have been executed.

By employing runtime profile 308 (e.g., application execution profile), code concurrency 310 may be identified. As discussed herein, code concurrency refers to a situation in which two or more basic blocks may be executed at about the same time. By identifying code concurrency, false sharing between two or more data fields may also be determined. Consider the situation wherein, for example, basic block $B_1$ may access data field $f_1$ and basic block $B_2$ may access data field $f_2$. If basic block $B_1$ and basic block $B_2$ are executed at about the same time, then code concurrency exists between $B_1$ and $B_2$. Also, false sharing may exist between the data fields ($f_1$ and $f_2$) that basic block $B_1$ and $B_2$ may have accessed if $B_1$ and $B_2$ access the fields $f_1$ and $f_2$ of the same structure instance. Hence code concurrency may be used as a conservative approximation for false sharing. This method is conservative because if $B_1$ and $B_2$ access fields $f_1$ and $f_2$ of two different instances of the data structure, then no false sharing may exist between fields $f_1$ and $f_2$ even though code concurrency may exist between $B_1$ and $B_2$.

Based on the runtime profile, cycle gain 312 may also be calculated. As discussed herein, cycle gain refers to a potential gain that may accrue due to spatial locality when two data fields are placed in the same cache line. Thus, by analyzing the set of cycle gains of an application program, spatial locality may be determined for a data structure.

In addition, a field map 314 may also be generated identifying the data fields that may be accessed in the application program. In an example, a data structure may have 50 data fields. However, only 25 data fields may be accessed by the application program. Thus, only 25 data fields may be included in the field map.

By employing a layout tool 316, a new structure layout 318 may be generated. In an embodiment, layout tool 316 may include a field layout graph and/or a cluster algorithm. By applying layout tool 316 to the data gathered in cycle gain 312, code concurrency 310, and field map 314, new structure layout 318 may be created that may maximize cycle gain and minimize false sharing.

Figure 4A:
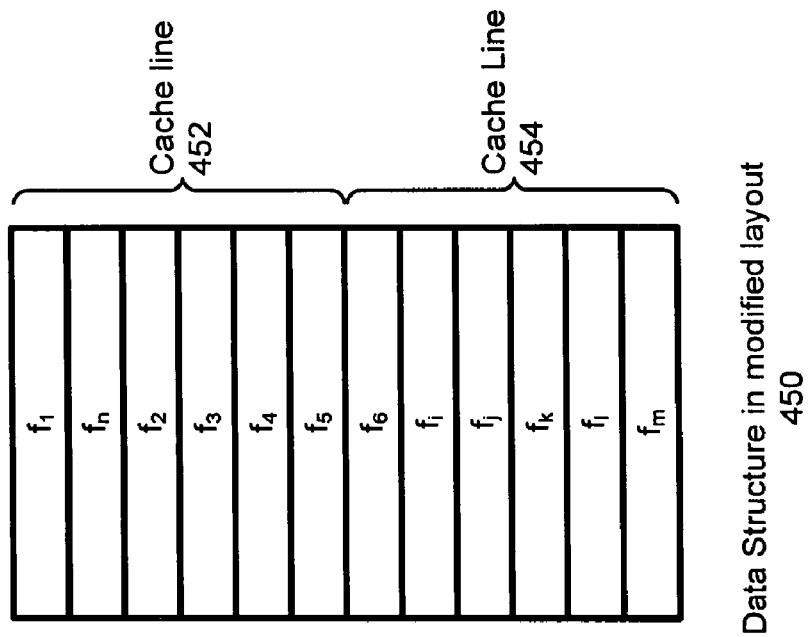
FIG. 4A shows, in an embodiment of the invention, a simple conceptual diagram of a modified data structure layout.
Figure 4A:
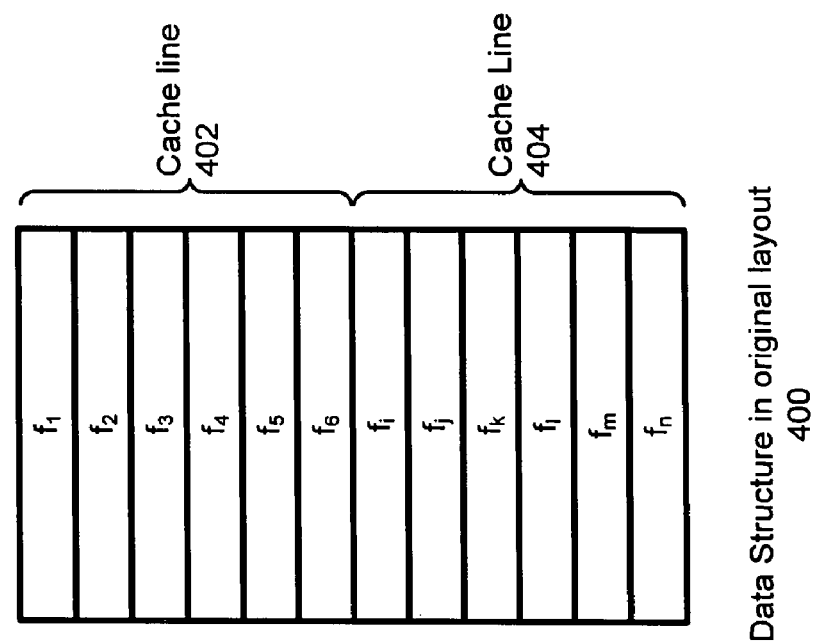

FIG. 4A shows, in an embodiment of the invention, a simple conceptual diagram of a modified data structure layout. Data structure 400 is an example of a data structure prior to the application of spatial locality. Data structure 400 may have two cache lines (cache line 402 and cache line 404). Cache line 402 may have multiple data fields, including fields $f_1$, $f_2$, $f_3$, $f_4$, $f_5$, and $f_6$. Similarly, cache line 404 may have multiple data fields, including fields $f_i$, $f_j$, $f_k$, $f_l$, $f_m$, and $f_n$.

Based on the pseudo code in FIG. 4B, a loop 408 is programmed to access two data fields, data field $f_1$ and data field $f_n$. Based on the current data structure, data field $f_1$ and data field $f_n$ are currently in two different cache lines. Accordingly, each time a processor executes loop 408, the processor may have to access two different cache lines.

Referring back to FIG. 4A, to improve memory performance, data structure 400 may be modified as shown by data structure 450. Since data field $f_1$ and data field $f_n$ are accessed together in loop 408, data field $f_n$ has been moved closer to data field $f_1$ and is now in the same cache line (cache line 452). Since cache line may have an allotted amount of space, a data field (e.g., data field $f_6$) may be moved into the second cache line (e.g., cache line 454). The rearrangement of data fields $f_1$ and $f_n$ into the same cache line (cache line 452) is an example of spatial locality.

Spatial locality may be quantified based on cycle gain. As aforementioned, cycle gain refers to a potential gain that may accrue due to spatial locality when two data fields are placed in the same cache line. Equation 1 below shows how cycle gain (CG) between two data fields may be calculated.

$$CG(f_1, f_2) = \sum_{i_1, i_2} CG(f_2, i_1, f_2, i_2) + \sum_{i_1, i_2} f_2, i_2, f_1, i_1) \quad \text{Equation 1}$$

According to Equation 1 above, the cycle gain is the contribution of a path starting from $i_1$ (instruction1), which accesses data field $f_1$ to $i_2$ (instruction2), which accesses data field $f_2$. Accordingly, cycle gain may equal to zero, the execution count of a loop, or the execution count of a straight line function depending upon the placement of the instructions in the application program.

If a pair of instructions does not belong to the same function, the cycle gain between two data fields may be zero. In an example, $i_1$ and $i_2$ do not belong to the same function; thus, the cycle gain is zero. In other words, the possibility of data fields $f_1$ and $f_2$ being assessed together in a single cache line is unlikely given that data fields $f_1$ and $f_2$ are not being assessed concurrently.

If a pair of instructions belongs to the same function and is part of a loop, the cycle gain between two data fields may equal to the execution count of a loop. In an example, $i_1$ and $i_2$ are in the same loop; thus, the cycle gain for data fields $f_1$ and $f_2$ may equal to the execution count of the loop. For example, if a loop is executed five times, then the cycle gain for the pair of data fields $f_1$ and $f_2$ is five.

If a pair of instructions belongs to the same straight line function, the cycle gain between two data fields may equal to the execution count of a straight line function. In an example, $i_1$ and $i_2$ are in the straight line function; thus, the cycle gain for data fields $f_1$ and $f_2$ may equal to the execution count of the straight line function. In an example, if a basic block is executed three times, then the cycle gain for the pair of data fields $f_1$ and $f_2$ is three.

Figure 4C:
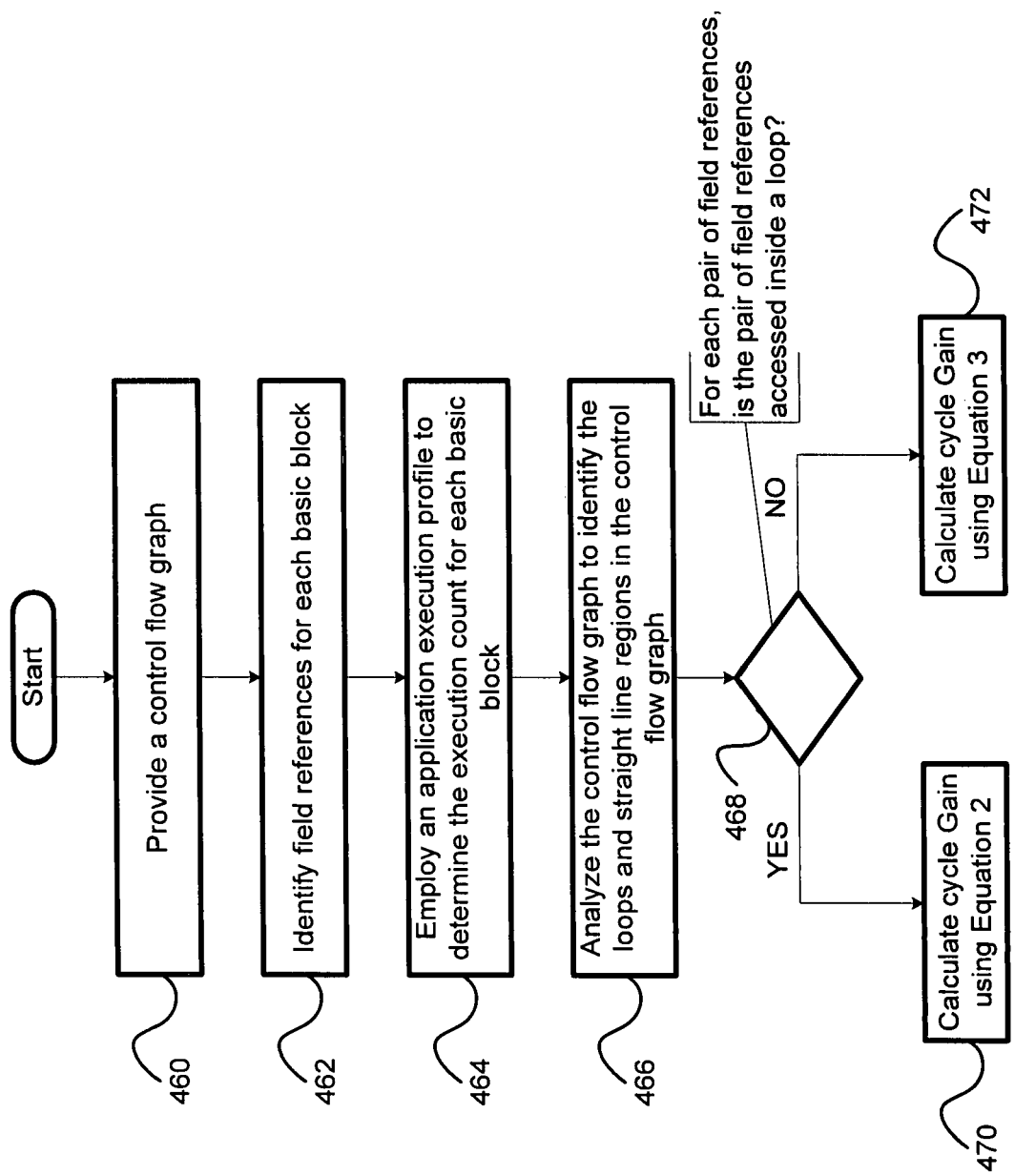
FIG. 4C shows, in an embodiment of the invention, a simple flow chart representing an example of a cycle gain algorithm.

FIG. 4C shows, in an embodiment of the invention, a simple flow chart representing an example of a cycle gain algorithm.

At a first step 460, a control flow graph of a function is provided as the input. Control flow graph is well-known in the art and usually refers to a series of basic blocks that are connected together by the order in which the basic blocks are executed.

At a next step 462, one or more field references for each basic block may be identified. As discussed herein, a field reference refers to a data field that is being referenced to in a function.

At a next step 464, the algorithm may employ an application execution profile (e.g., runtime profile) to compute an execution count for each basic block. To generate the application execution profile, the application program may be executed at least once in order to identify the basic blocks that may have been executed and the function of each basic block. From the application execution profile, the execution count for each basic block may be determined.

At a next step 466, the algorithm may analyze the control flow graph to identify the loops and the straight line functions. In identifying the loops and the straight line functions, the algorithm may also determine the execution count for each loop and/or straight line function. Note that the execution count for a straight line function may be equal to the execution count of a basic block since the straight line function may occur only once in a basic block.

At a next step 468, for each pair of field references, the algorithm may determine if the pair is accessed inside a loop.

$$CG(f_1, f_2) = \text{ExecutionCount(loop)} \quad \text{Equation 2}$$

$$CG(f_1, f_2) = \text{ExecutionCount(BasicBlock)} \quad \text{Equation 3}$$

If the pair of field references is accessed inside a loop, then at a next step 470, the algorithm may calculate cycle gain for the pair of field references by employing Equation 2, as shown above.

If the pair of field references is accessed in a straight line function, then at a next step 472, the algorithm may calculate cycle gain for the pair of field references by employing Equation 3, as shown above.

As shown in FIG. 4A, 4B, and 4C, spatial locality for a data structure may be determined by performing cycle gain calculations. In other words, by placing two data fields with a high cycle gain value spatially close to one another, memory performance may improve if the two data are accessed together in the same cache line.

Figure 5A:
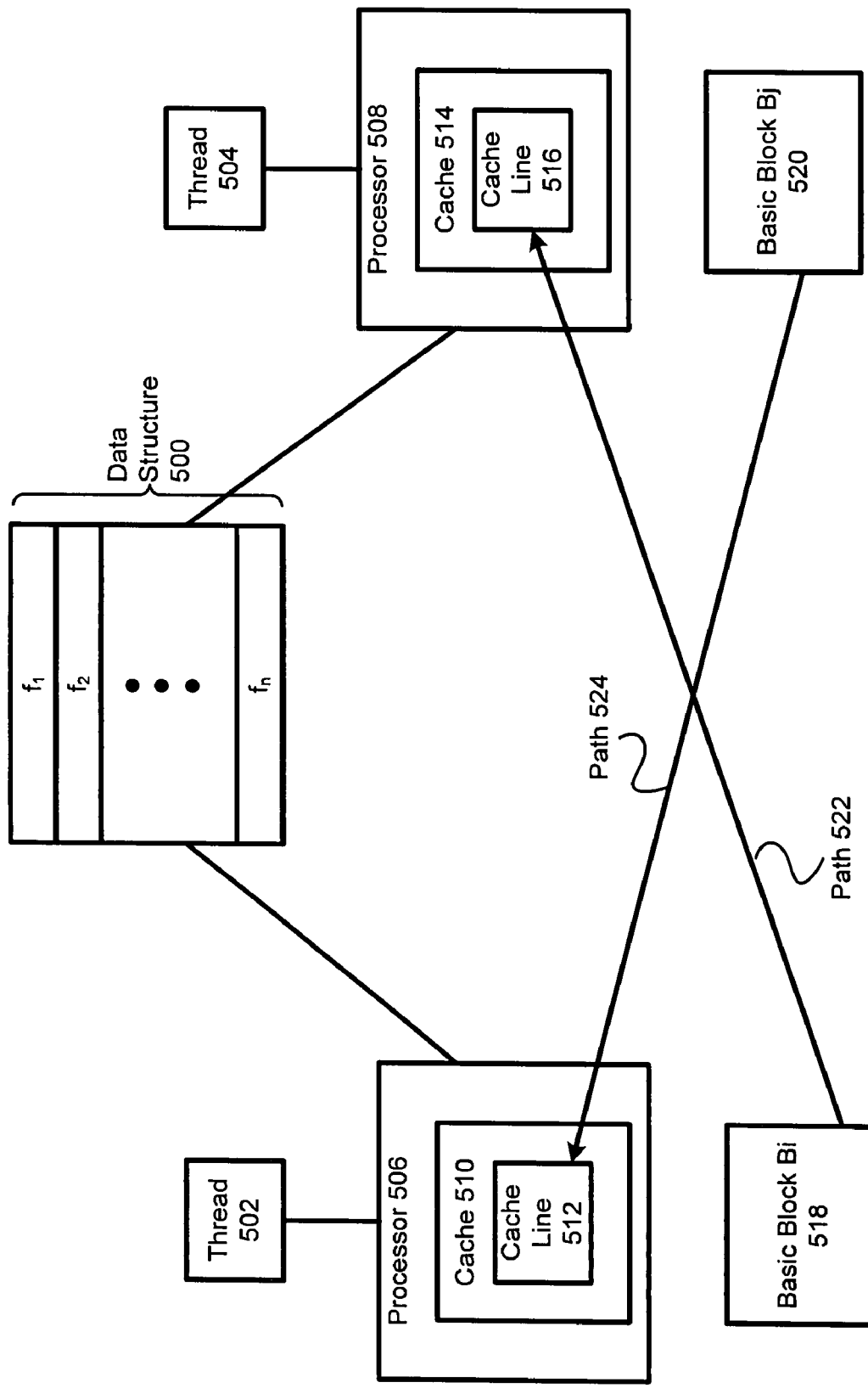
FIG. 5A shows, in an embodiment of the invention, a simple conceptual diagram illustrating approximation of false sharing measurement using code concurrency.

In addition to calculating cycle gain, code concurrency may also have to be calculated in order to generate a new structure layout. FIG. 5A shows, in an embodiment of the invention, a simple conceptual diagram illustrating approximation of false sharing measurement using code concurrency.

A data structure 500 may include a plurality of fields, such as $f_1$, $f_2$, and $f_n$. Data structure 500 may be accessed by a thread 502 and a thread 504, which is associated with a processor 506 and a processor 508, respectively. Processor 506 may have a cache 510, which may include a cache line 512. Similarly, processor 508 may have a cache 514, which may include a cache line 516. Both cache lines 512 and 516 may include both fields $f_1$, ad $f_2$.

Consider the situation wherein, for example, processor 506 may be executing a basic block $B_i$ (518) and processor 508 may concurrently be executing a basic block $B_j$ (520) at time interval I. During execution, processor 506 may be trying to access field $f_1$ while processor 508 may be trying to access field $f_2$. Since both fields $f_1$ and $f_2$ are located in the same cache line, any modification processors 506 and 508 may make to the fields of the data structure may result in false sharing. Thus, to prevent false sharing, each processor may have to invalidate the other processor's copy of the data structure. In an example, if processor 506 wants to modify field $f_1$, processor 506 may have to first invalidate processor 508 copy of at least a portion of data structure 500 (cache line 516), as shown by path 522. Similarly, if processor 508 wants to modify field $f_2$, processor 508 may have to first invalidate cache line 512, as shown by path 524.

Basic blocks 518 and 520 are examples of code concurrency. By executing both basic blocks 518 and 520 simultaneously, false sharing may occur between fields $f_1$ and $f_2$. To identify false sharing in an application program, code concurrency may have to be determined. In other words, by identifying when two basic blocks may be executed at about the same time, false sharing between two fields may be determined.

Figure 5B:
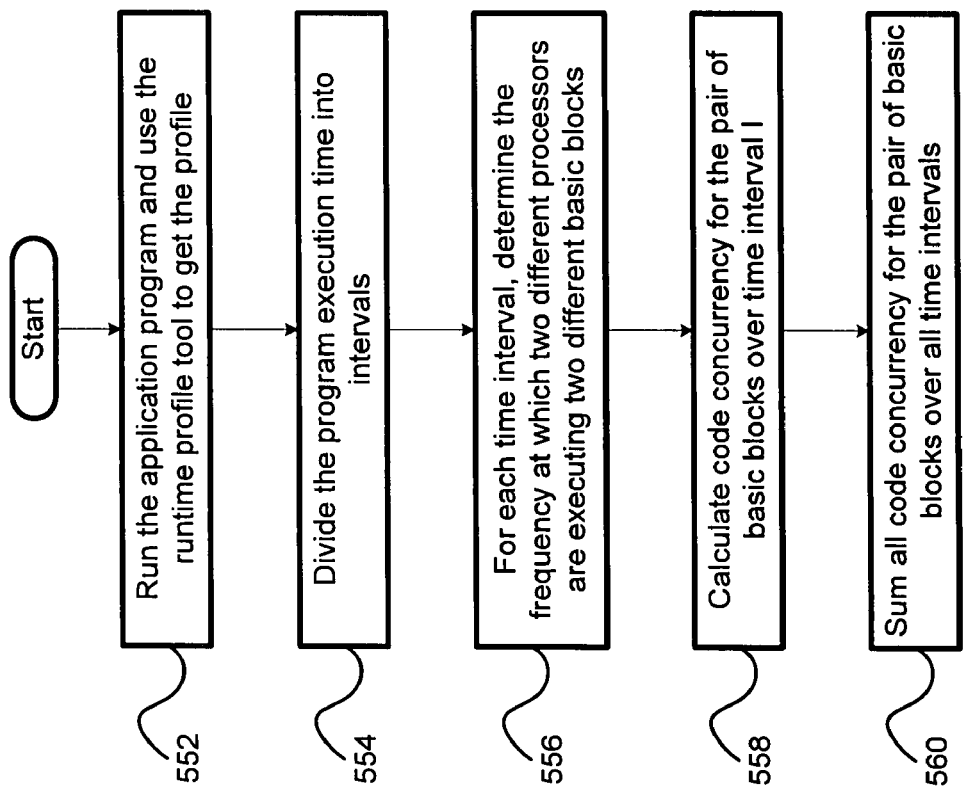
FIG. 5B shows, in an embodiment of the invention, a simple flow chart illustrating an algorithm for approximating false sharing measurement by determining code concurrency.

FIG. 5B shows, in an embodiment of the invention, a simple flow chart illustrating an algorithm for approximating false sharing measurement by determining code concurrency.

At a first step 552, an application program is executed to generate a runtime profile. The runtime profile may be employed to determine when each basic block may have been executed and the function of each basic block. Consider the situation wherein, for example, an application program is executed.

At a next step 554, the execution time of the application program is divided into intervals. In an example, the total execution time for the application program may be divided into a set of time intervals.

$$CC_I(B_i, B_j) = \sum_{P_1, P_2} \min(F_I(P_1, B_i), F_I(P_2, B_j)) \quad \text{Equation 4}$$

For each time interval, the frequency at which two different processors are executing two different basic blocks may be determined, at a next step 556. In an embodiment, the minimum number of frequency a basic block may be executed may be calculated (see Equation 4 above). In an example, a pair of processors $P_1$ and $P_2$ are executing basic blocks $B_i$ and $B_j$, respectively in a time interval I. The algorithm may be calculating the least number of times the basic blocks $B_i$ and $B_j$ may be executed during time interval I. The same calculations may be calculated for other pair of processors that may be accessing the same pair of basic blocks ($B_i$ and $B_j$) during the same time interval I.

At a next step 558, code concurrency for a time interval may be calculated. In an example, the sum of the frequencies for all pairs of processors for the two basic blocks ($B_i$ and $B_j$) during time interval I may be calculated.

At a next step 560, code concurrency for the pair of basic blocks ($B_i$ and $B_j$) for the entire application program (e.g., all time intervals) may be calculated. In an example, the code concurrency for pair of basic blocks $B_i$ and $B_j$ for all time intervals may be totaled.

$$FalseSharing(f_1, f_2) = \sum_{B_i, B_j} CC(B_i, B_j) \quad \text{Equation 5}$$

In an embodiment, code concurrency between two basic blocks may be significantly similar to false sharing between two fields. In an example, during execution of basic block $B_i$, field $f_1$ is accessed; and during execution of basic block $B_j$, field $f_2$ is accessed. Thus, code concurrency between basic block $B_i$ and basic block $B_j$ is significantly the same as false sharing between field $f_1$ and field $f_2$ (as shown in Equation 5 above).

Once the cycle gain has been calculated and the code concurrency has been identified, a layout tool may be employed to create a new structure layout that maximizes spatial locality while minimizing false sharing. In an embodiment, the layout tool may include a field layout graph and a cluster algorithm.

Figure 6A:
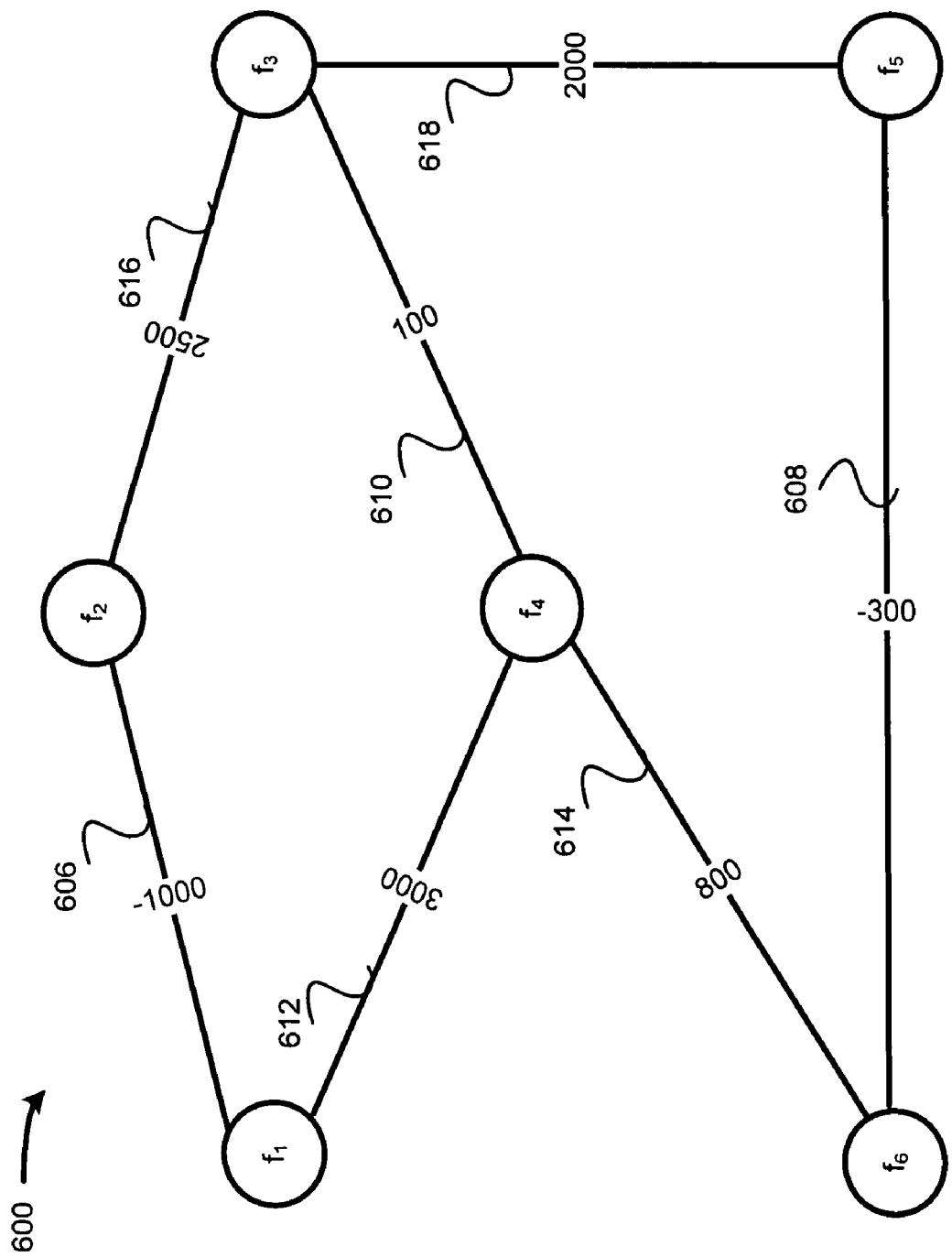
FIG. 6A shows, in an embodiment of the invention, a simple diagram of a field layout graph, which may be employed as a layout tool to generate a new structure layout.

FIG. 6A shows, in an embodiment of the invention, a simple diagram of a field layout graph, which may be employed as a layout tool to generate a new structure layout. Consider the situation wherein, for example, an application program has been executed. To customize a field layout graph 600, the data fields from a data structure that had been accessed during the execution of an application program may be mapped as nodes (e.g., vertices) on the field layout graph. The information about the data fields may be gathered from a field map that may be generated from the runtime profile, in an embodiment. In this situation, assume that the application program may access six data fields ($f_1$, $f_2$, $f_3$, $f_4$, $f_5$, and $f_6$) during execution. Thus, the field layout graph may include six nodes.

For each pair of data fields that may have been accessed simultaneously, an edge (606, 608, 610, 612, 614, 616, and 618) may connect the pair. In an example, edge 606 may exist between data fields $f_1$ and $f_2$. In an embodiment, an edge does not exist between a pair of data fields if the cycle gain value and/or false sharing value are zero. In another example, during execution of the application program, data fields $f_1$ and $f_6$ are not accessed at the same time. As a result, no cycle gain value and/or false sharing value have been calculated.

For each pair of data fields that have an edge, an edge weight may be calculated. In an embodiment, an edge weight value is the difference between the cycle gain of a pair of data fields and the false sharing between the same pair of data fields. In other words, edge weight value may represent potential gain or loss that may occur in placing two or more data fields (nodes) in the same cache line. In an embodiment, a higher positive edge weight value usually indicates a higher possibility of spatial locality and lesser chance for false sharing.

$$W(f_1, f_2) = \text{CycleGain}(f_1, f_2) - \text{FalseSharing}(f_1, f_2) \quad \text{Equation 6}$$

In an example, as shown by Equation 6, edge weight value for a pair of data fields ($f_1$ and $f_2$) may be calculated by subtracting the false sharing value from the cycle gain value for the same pair of data fields. In this example, the edge weight value of the pair of data fields $f_1$ and $f_2$ is negative 1000. In this example, the possibility of false sharing between data fields $f_1$ and $f_2$ may be fairly high.

Once the field layout graph has been drawn for the data structure, the fields may be grouped to form a set of clusters. In creating each cluster, the field layout graph is divided into clusters that maximize spatial locality and minimize false sharing. In an embodiment, the intra-cluster edge weights are maximized and the inter-cluster edge weights are minimized. In addition, each cluster is limited by a cache line limitation.

Figure 6B:
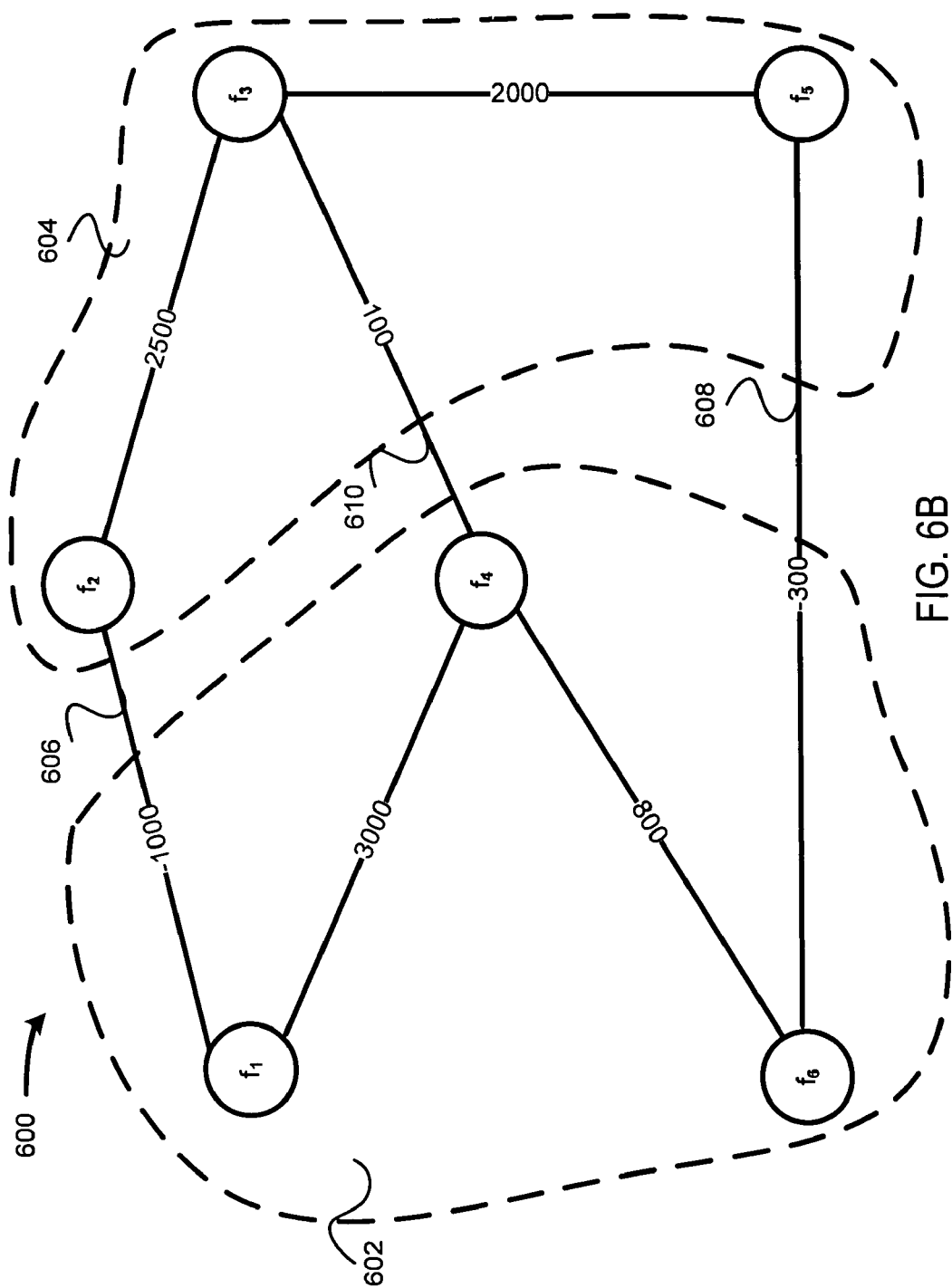
FIG. 6B shows, in an embodiment, field layout graph divided into two clusters.

FIG. 6B shows, in an embodiment, field layout graph 600 divided into two clusters, cluster 602 and cluster 604. Cluster 602 includes data fields $f_1$, $f_4$, and $f_6$ whereas cluster 604 includes data fields $f_2$, $f_3$, and $f_5$. The data fields are divided into clusters such that the intra-cluster edge weights are maximized and the inter-cluster edge weights are minimized. In an example, the value of the sum of the edge weights for cluster 602 is 3800. However, if cluster 602 also includes data field $f_2$, the value of the sum of the edge weights for cluster 602 will be lowered to 2800 since the edge weight between data fields $f_1$ and $f_2$ is a negative 1000. As a result, a cluster that does not include both data fields $f_1$ and $f_2$ may have better memory performance since the possibility of false sharing may be less.

Once the clusters have been formed, the connection between each pair of data fields in different clusters is broken. In an example, the edge (606) between data fields $f_1$ and $f_2$ is broken. In another example, the edge (608) between data fields $f_6$ and $f_5$ and the edge (610) between data fields $f_4$ and $f_3$ are also broken.

Figure 6C:
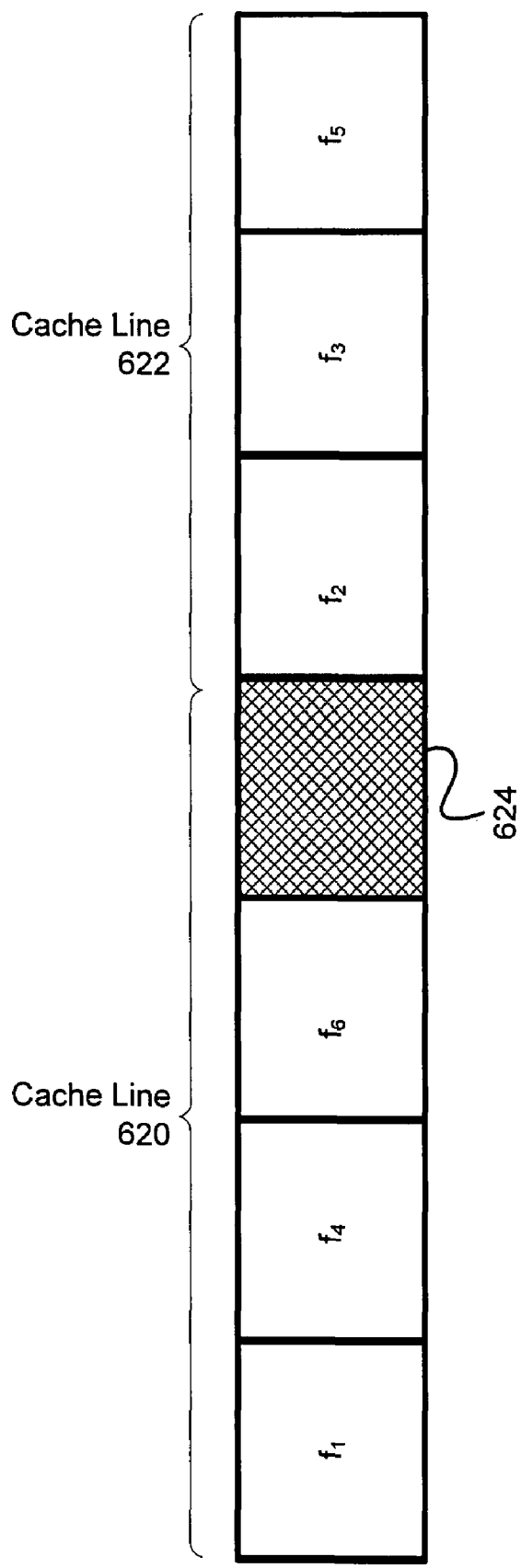
FIG. 6C shows, in an embodiment of the invention, an example of two cache lines.

In an embodiment, each cluster may form a cache line. FIG. 6C shows, in an embodiment of the invention, an example of two cache lines 620 and 622. In an example, the data fields ($f_1$, $f_4$, and $f_6$) of cluster 602 may be included in a cache line 620 while the data fields ($f_2$, $f_3$, and $f_5$) of cluster 604 may be included in a cache line 622. In an embodiment, if a cache line is larger in byte size than a cluster, then the remaining part of the cache line may include a padded field 624.

Figure 7:
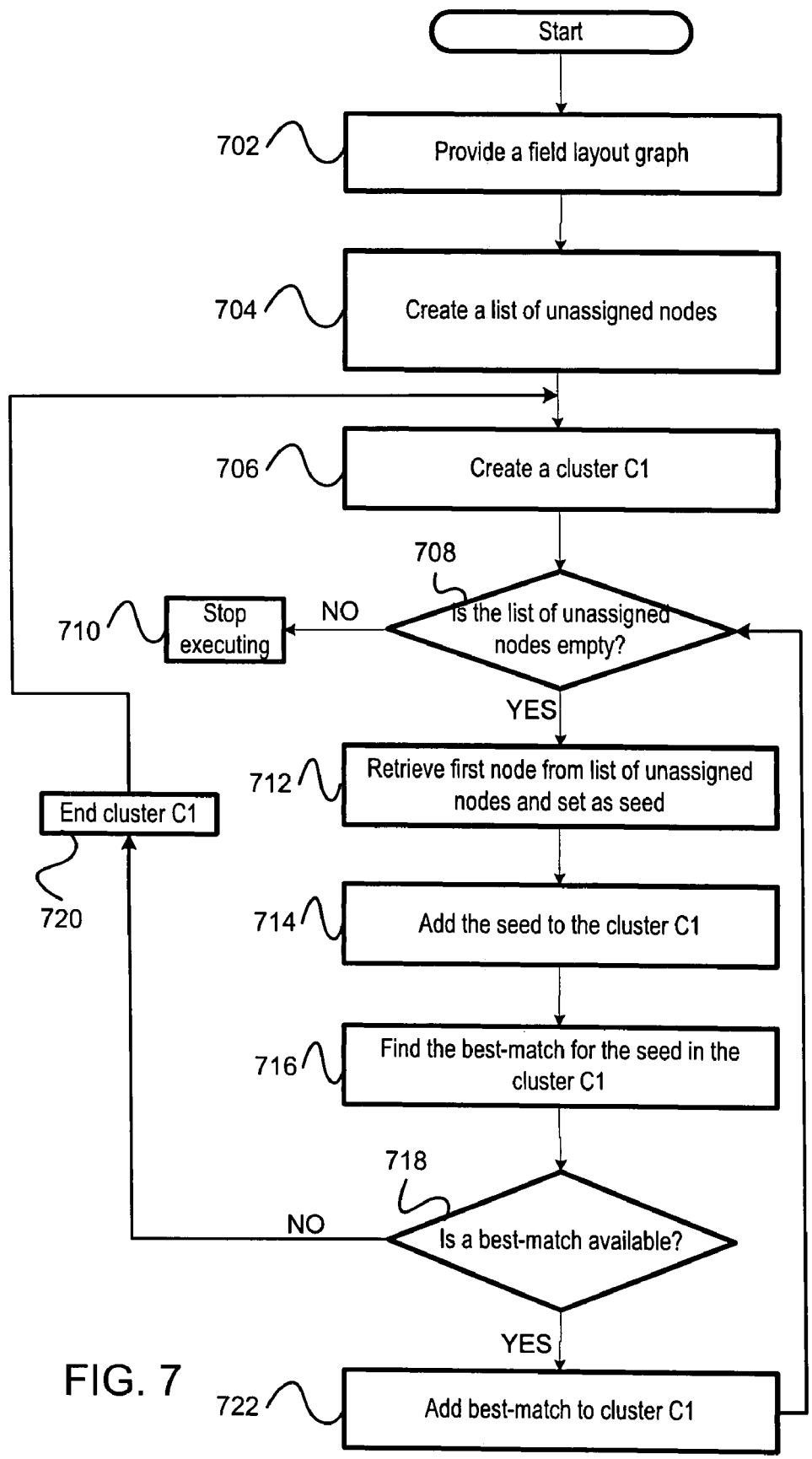
FIG. 7 shows, in an embodiment, a simple flow chart illustrating a clustering algorithm.

FIG. 7 shows, in an embodiment, a simple flow chart illustrating a clustering algorithm.

At a first step 702, a field layout graph is provided as input to the clustering algorithm. In an embodiment, the field layout graph may include nodes (data fields in a data structure), edges between the fields, and edge weights.

At a next step 704, a list of unassigned nodes may be created. The unassigned nodes may include the nodes on the field layout graph that have not been assigned to a cluster. Initially, the list of unassigned nodes may include all nodes on the field layout graph. In an example, the list of unassigned nodes may include data fields ($f_1$, $f_2$, $f_3$, $f_4$, $f_5$, and $f_6$). In an embodiment, the nodes may be sorted by execution count (frequency). In an embodiment, the nodes may be sorted by the cycle gain values.

At a next step 706, a cluster $C_1$ is defined. At this point in the algorithm, cluster $C_1$ is initially empty and does not include any node.

At a next step 708, the algorithm may make a determination if the list of unassigned nodes is emptied.

If the list of unassigned nodes is empty, then at a next step 710, the algorithm may stop execution.

However, if the list of unassigned nodes is not empty, then at a next step 712, the first node in the list of unassigned nodes may be set as a seed. Note, since the list of unassigned nodes are sorted in order of execution count, the first node may have the highest execution count, in an embodiment. In an example, data field $f_1$ may have the highest execution count. Therefore, data field $f_1$ may be chosen as the first node.

At a next step 714, the seed is added to the cluster $C_1$. In an example, data field $f_1$ is added to cluster $C_1$.

At a next step 716, the algorithm may calculate the best-match for the first cluster.

Figure 8:
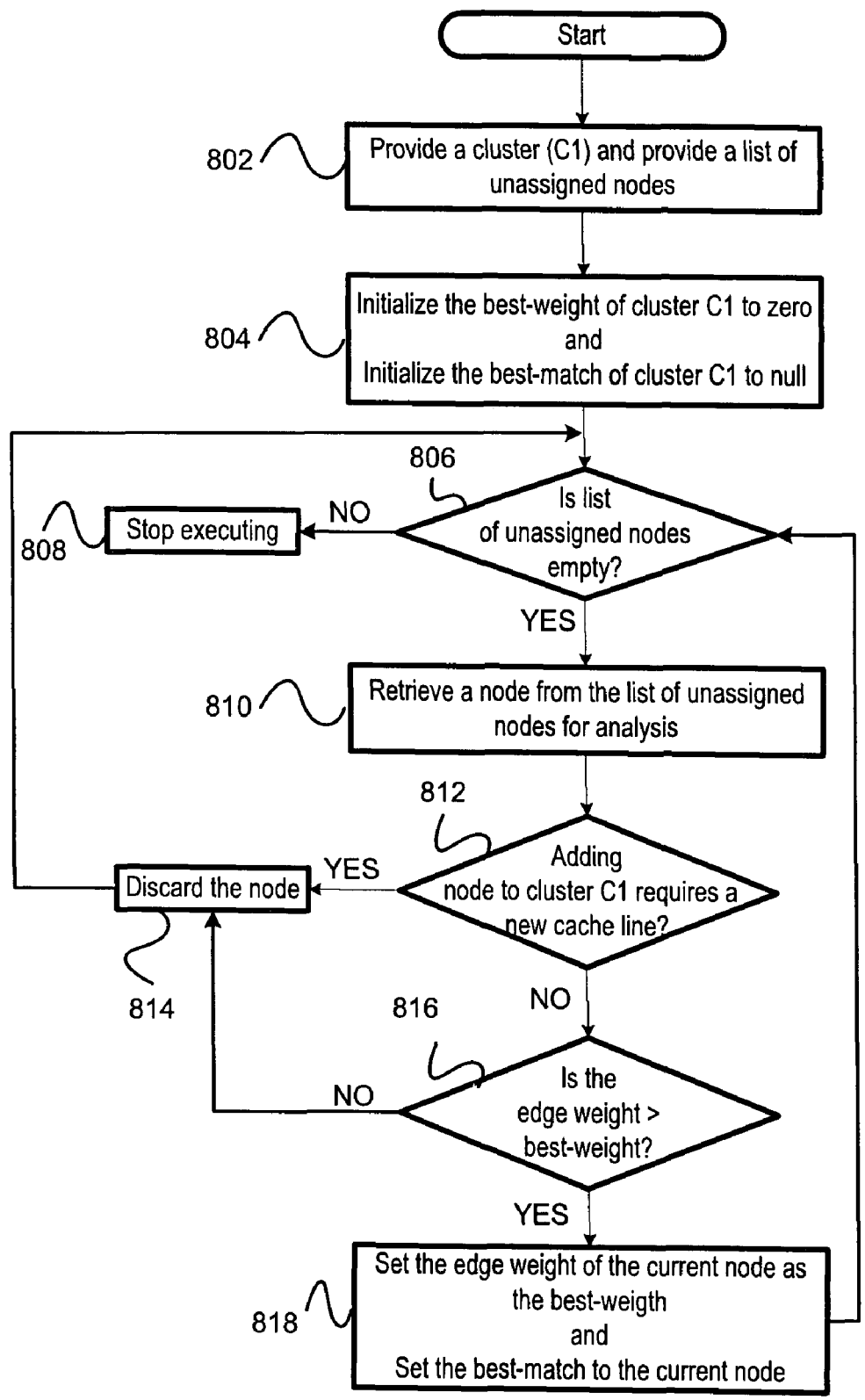
FIG. 8 shows, in an embodiment of the invention, a simple flow chart illustrating a best-match algorithm.

FIG. 8 shows, in an embodiment of the invention, a simple flow chart illustrating a best-match algorithm. In an embodiment, the best-match algorithm is configured to maximize spatial locality and minimize false sharing.

At a first step 802, the cluster $C_1$ with the seed (data field $f_1$) and the list of unassigned nodes of the filed layout graph is provided as input to the best-match algorithm.

At a next step 804, a best-weight value is initially set to zero and a best-match value is set to null.

At a next step 806, the algorithm determines if the list of unassigned nodes is empty. In this example, the list of unassigned nodes may include ($f_2$, $f_3$, $f_4$, $f_5$, and $f_6$).

If the list of unassigned nodes is empty, at a next step 808, the algorithm may stop executing.

However, if the list of unassigned nodes is not empty, then at a next step 810, a node from the list of unassigned nodes may be added to the cluster $C_1$. In an example, data field $f_2$ may be added to the cluster $C_1$.

At a next step 812, the algorithm may check to determine if adding the node to the cluster $C_1$ may require the creation of a new cache line. In other words, the algorithm checks to make sure that adding an additional data field to the current cluster does not cause the cluster to exceed its cache line size limitation.

If adding the node to the cluster $C_1$ causes the cluster to be too big for the cache line, then at a next step 814, the node is discarded and the algorithm returns to step 806 to retrieve another node.

However, if adding the node to the cluster $C_1$ does not cause the current cluster to be too big for the cache line, then at a next step 816, the algorithm determines if the edge weight value of the node being analyzed is greater then the current best-weight value. In an embodiment, the best-weight value is the highest edge weight value for the cluster.

If the edge weight value between the node currently being analyzed and the seed (e.g., data fields f1 and f2) is not greater then the current best-weight value, then the node is discarded at step 814 and the algorithm returns to step 806 to analyze the next node in the list of unassigned nodes. In an example, the edge weight value for pair of data fields f1 and f2 is negative 1000. Since the edge weight value for pair of data fields f1 and f2 is less than the current best-weight value (which is zero), the node (data field f2) is discarded.

However, if the new edge weight value is greater then the current best-weight value, then at a next step 818, the edge weight value for the current node is set as the new best-weight value. Also the node currently being analyzed may replace the node that currently resides in the cluster $C_1$ as the best-match value. In an example, assume that the current best-weight value is zero and the node currently being analyzed is data field $f_4$. In this example, the edge weight value for pair of data fields $f_1$ and $f_4$ (3000) is greater than the current best-weight value of the cluster $C_1$. As a result, the best-weight value for cluster $C_1$ is replaced by the edge weight value for data fields $f_1$ and $f_4$.

Steps 806 through 818 are iterative steps that may be repeated until the list of unassigned nodes is empty. During each iteration, the best-weight value and the best-match value may be replaced if the edge weight value of the node currently being analyzed and the seed is greater than the current best-weight value of the cluster $C_1$.

Referring back to FIG. 7, at a next step 718, the algorithm determines whether or not a best-match value is available. If a best-match value is not available, then at a next step 720, the cluster $C_1$ is complete and no addition nodes may be added to the cluster and the algorithm returns to next step 706 to create the next cluster.

However, if a best-match value is identified, then at a next step 722, the best-match value is added to the cluster $C_1$. In an example, data field $f_4$ is considered as the best-match value for data field $f_1$.

Steps 708 to 722 are iterative steps and may be repeated until no further best-match value may be identified for the cluster. In an example, data field $f_4$ is considered as the best-match for the data field $f_1$. In the next iteration, data field $f_4$ is considered as the seed and the cluster algorithm and the best-match algorithm are employed to determine the best-match for data field $f_4$. In an embodiment, the cluster may have a size limit. In an example, the size of a cluster may be limited by the cache line size. As a result, the number of data fields in a cluster may have to be limited based on the cache line size.

As can be appreciated from the forgoing, one or more embodiments of the present invention provide for methods and apparatuses for creating a structure layout that improves memory performance in a multi-threaded environment. With the optimized multi-threaded structure layout, the possibility of cache lines being invalidated may be significantly reduced by accounting for false sharing in the creation of the cache lines. By minimizing the possibility of a cache line invalidation, the optimized multi-threaded structure layout greatly increases efficiency while improving overall performance.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for performing structure layout optimization of a data structure comprising a set of data fields in a multi-threaded environment, comprising:
    determining a set of code concurrency values, each of said code concurrency values being indicative of potential false sharing among said set of data fields;
    calculating a set of cycle gain values, each of said cycle gain values being indicative of spatial locality between a pair of said data fields;
    employing said set of cycle gain values and said set of code concurrency values to create a field layout graph, said field layout graph being configured to illustrate relationships between said set of data fields of said data structure; and
    employing a cluster algorithm to said field layout graph to create a set of clusters, each cluster of said set of clusters being employed to generate a cache line.

2. The computer-implemented method of claim 1 wherein each code currency value of said set of code currency value is configured to indicate potential false sharing between said set of data fields of said data structure when said set of data fields of said data structure is accessed by a set of basic blocks at a time period.

3. The computer-implemented method of claim 1 wherein each cycle gain value of said set of cycle gain values is configured to indicate potential gain that accrues due to spatial locality between a pair of data fields of said set of data fields.

4. The computer-implemented method of claim 3 wherein said each cycle gain value of said set of cycle gain values is zero when said pair of data fields of said set of data fields is not accessed by the same function.

5. The computer-implemented method of claim 3 wherein said each cycle gain value of said set of cycle gain values for said pair of data fields of said set of data fields is equaled to execution count of a loop.

6. The computer-implemented method of claim 3 wherein said each cycle gain value of said set of cycle gain values for said pair of data fields of said set of data fields is equaled to execution count of a straight line function.

7. The computer-implemented method of claim 3 wherein said each cycle gain value of said set of cycle gain values is employed to create an edge between said pair of data fields of said set of data fields.

8. The computer-implemented method of claim 7 wherein a set of edge weight values is calculated for said set of data fields of said data structure, a first edge weight value of said set of edge weight values being calculated by determining a difference between a first cycle gain value of said set of cycle gain values and a first code concurrency value of said set of code currency values.

9. The computer-implemented method of claim 1 wherein said each cluster of said set of clusters is determined by employing a best-match algorithm, said best-match algorithm is configured to maximize an intra-cluster edge weight value and minimize an inter-cluster edge weight value.

10. An article of manufacture comprising a program storage medium having computer readable code embodied therein, said computer readable code being configured for performing structure layout optimization of a data structure comprising a set of data fields in a multi-threaded environment, comprising:
   code for determining a set of code concurrency values, each of said code concurrency values being indicative of potential false sharing among said set of data fields;
   code for calculating a set of cycle gain values, each of said cycle gain values being indicative of spatial locality between a pair of said data fields;
   code for employing said set of cycle gain values and said set of code concurrency values to create a field layout graph, said field layout graph being configured to illustrate relationships between said set of data fields of said data structure; and
   code for employing a cluster algorithm to said field layout graph to create a set of clusters, each cluster of said set of clusters being employed to generate a cache line.

11. The article of manufacture of claim 10 wherein each code currency value of said set of code currency value is configured to indicate potential false sharing between said set of data fields of said data structure when said set of data fields of said data structure is accessed by a set of basic blocks at a time period.

12. The article of manufacture of claim 10 wherein each cycle gain value of said set of cycle gain values is configured to indicate potential gain that accrues due to spatial locality between a pair of data fields of said set of data fields and wherein said each cycle gain value of said set of cycle gain values for said pair of data fields of said set of data fields depends upon how said pair of data fields of said set of data fields is being accessed, wherein
   if said pair of data fields of said set of data fields is not accessed by the same function, said each cycle gain value of said set of cycle gain values is zero,
   if said pair of data fields of said set of data fields is accessed within a loop, said each cycle gain value of said set of cycle gain values is equaled to execution count of said loop, and
   if said pair of data fields of said set of data fields is accessed within a straight line function, said each cycle gain value of said set of cycle gain values is equaled to execution count of said straight line function.

13. The article of manufacture of claim 12 wherein said each cycle gain value is employed to create an edge between said pair of data fields of said set of data fields.

14. The article of manufacture of claim 13 wherein a set of edge weight values is calculated for said set of data fields of said data structure, a first edge weight value of said set of edge weight values being calculated by employing a code for determining a difference between a first cycle gain value of said set of cycle gain values and a first code concurrency value of said set of code currency values.

15. The article of manufacture of claim 10 wherein said each cluster of said set of clusters is determined by employing a code for employing a best-match algorithm, said best-match algorithm including a code for maximizing an intra-cluster edge weight value and minimizing an inter-cluster edge weight value.

16. An arrangement for generating a structure layout of a data structure comprising a set of data fields, said structure layout optimizing memory performance in a multi-threaded environment, comprising:
   computer-based means for determining a set of code concurrency values, each of said code concurrency values being indicative of potential false sharing among said set of data fields;
   computer-based means for calculating a set of cycle gain values, each of said cycle gain values being indicative of spatial locality between a pair of said data fields;
   computer-based means for employing said set of cycle gain values and said set of code concurrency values to create a field layout graph, said field layout graph being configured to illustrate relationship between said set of data fields of said data structure; and
   computer-based means for employing a cluster algorithm to said field layout graph to create a set of clusters, each cluster of said set of clusters being employed to generate a cache line.

17. The arrangement of claim 16 wherein each code currency value of said set of code currency value is configured to indicate potential false sharing between said set of data fields of said data structure when said set of data fields of said data structure is accessed by a set of basic blocks at a time period.

18. The arrangement of claim 16 wherein each cycle gain value of said set of cycle gain values is configured to indicate potential gain that accrues due to spatial locality between a pair of data fields of said set of data fields, and wherein said each cycle gain value of said set of cycle gain values for said pair of data fields of said set of data fields depends upon how said pair of data fields of said set of data fields is being accessed, wherein
   if said pair of data fields of said set of data fields is not accessed by the same function, said each cycle gain value of said set of cycle gain values is zero,
   if said pair of data fields of said set of data fields is accessed within a loop, said each cycle gain value of said set of cycle gain values is equaled to execution count of said loop, and
   if said pair of data fields of said set of data fields is accessed within a straight line function, said each cycle gain value of said set of cycle gain values is equaled to execution count of said straight line function.

19. The arrangement of claim 18
wherein said each cycle gain value of said set of cycle gains is employed to create an edge between said pair of data fields of said set of data fields, and
wherein a set of edge weight values is calculated for said set of data fields of said data structure, a first edge weight value of said set of edge weight values being calculated by determining a difference between a first cycle gain value of said set of cycle gain values and a first code concurrency value of said set of code currency values.

20. The arrangement of claim 16 wherein said each cluster of said set of clusters is determined by employing a best-match algorithm, said best-match algorithm is configured to maximize an intra-cluster edge weight value and minimize an inter-cluster edge weight value.

* * * * *